July 11, 1950 — M. E. BUEHLER — 2,514,369
RELATIVE TIME DIFFERENCE INDICATING SYSTEM
Filed April 9, 1948 — 5 Sheets-Sheet 1

INVENTOR.
MAURICE E. BUEHLER
BY Wade Koontz
ATTORNEY
James J. Shannon
AGENT

INVENTOR.
MAURICE E. BUEHLER
BY Wade Keulty
ATTORNEY
James J. Shannon
AGENT

July 11, 1950 M. E. BUEHLER 2,514,369
RELATIVE TIME DIFFERENCE INDICATING SYSTEM
Filed April 9, 1948 5 Sheets-Sheet 5

INVENTOR.
MAURICE E. BUEHLER
BY Wade Koontz
ATTORNEY
James L. Shannon
AGENT

Patented July 11, 1950

2,514,369

UNITED STATES PATENT OFFICE 2,514,369

RELATIVE TIME DIFFERENCE INDICATING SYSTEM

Maurice E. Buehler, Dayton, Ohio

Application April 9, 1948, Serial No. 20,119

5 Claims. (Cl. 175—381)

(Granted under the act of March 3, 1883, as amended April 30, 1928; 370 O. G. 757)

The invention described herein may be manufactured and used by or for the Government for governmental purposes without payment to me of any royalty thereon.

This invention relates to a circuit for determining the time sequence and the time difference existing between two recurrent voltage pulse trains to a high order of accuracy. It is the particular object of the invention to provide a circuit which is capable of producing a direct voltage the polarity of which is determined by the time sequence of the pulse trains and the amplitude of which is a function of the time difference between corresponding pulses of the two trains. The amplitude of the direct voltage may be made to decrease from a maximum or to increase from zero as the time difference increases from zero as will be subsequently explained.

The circuit consists essentially of two resistance coupled tubes with the anode of each tube coupled to the grid of the other tube so that the two tubes and associated coupling circuits form a regenerative loop. In such a circuit only one of the tubes may be conductive at a time so that the circuit has two conditions of stability. Means are provided for applying the two pulse trains to the two tubes in such a way that during the presence of a pulse the tube is rendered non-conductive. Therefore it is seen that the latter of a pair of corresponding pulses of the two pulse trains determines which tube is the last to become non-conductive and to remain so until the arrival of the next pair of pulses. The output voltage is taken as the difference between the anode or the cathode voltages of the two tubes and its polarity is determined by the greater of the two anode or cathode voltages. Which of these two voltages is the greater is in turn determined by the time sequence of the two pulse trains. The amplitude of the difference voltage is determined by the time difference between pulses of a corresponding pair. In the above described circuit this voltage is greatest at zero time difference and changes rapidly from a maximum of one polarity to a maximum of the opposite polarity at this point. As the time difference increases the output voltage diminishes.

The character of the output voltage may be changed so that it is zero at zero time difference and increases as the time difference increases by introducing a time modulation of the pulses in the trains, as will be explained later.

The circuit may be used in an automatic navigational system in which a moving object such as an airplane is caused to move in a plane which is the perpendicular bisector of a line joining two transmitter stations that transmit pulses simultaneously. The voltage produced by the circuit may be used to control an automatic steering device such as an auto-pilot. The circuit may also be used to monitor the output of two transmitter stations of the above mentioned type, the resulting output voltage produced by the circuit being used to control one of the transmitter stations to insure coincidence of the transmitted pulses. Other uses for the circuit will become apparent.

The specific details and a number of specific embodiments of the circuit will be described in connection with the accompanying drawings in which:

Figs. 2 and 3 are diagrams explaining the operation of the circuit in Fig. 1,

Figure 1:
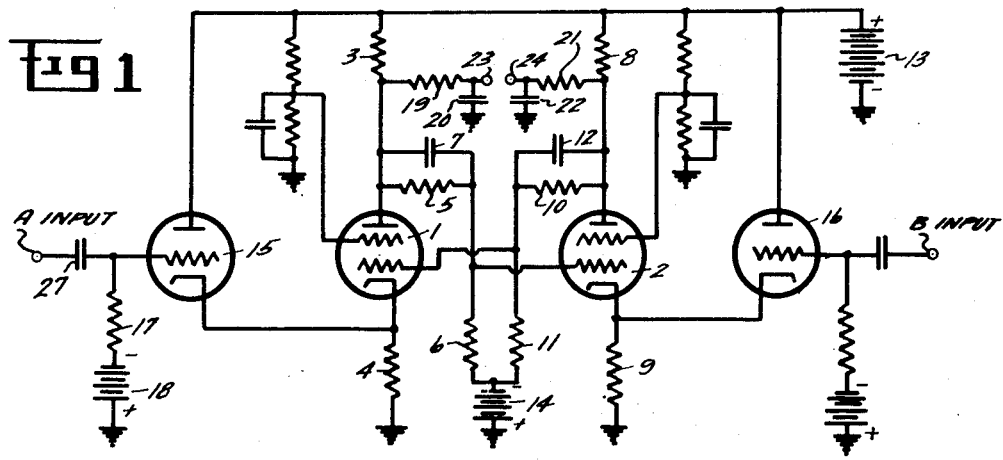
Fig. 1 shows one embodiment of the invention.

Referring to Fig. 1, tube 1 having an anode resistor 3 and a cathode resistor 4 is coupled to the input of tube 2 by a coupling network comprising resistors 5 and 6 and condenser 7. The function of condenser 7 is to compensate for the effect of the inherent input capacity of tube 2 and thereby to broaden the frequency transmission characteristic of the network by extending the high frequency end. Tube 2 and its associated circuit elements are similar in all respects to tube 1 and its circuit elements. Tube 2 has anode and cathode resistors 8 and 9 and is coupled to the input of tube 1 by means of the coupling network comprising resistors 10 and 11 and condenser 12. Tubes 1 and 2 receive their energization from a source of direct current 13. The source of direct voltage 14 serves to apply a fixed bias voltage to the grids of tubes 1 and 2. The voltage of source 14 is of sufficient value to overcome the voltage drop across resistor 6 or 11 and to cut off the space current in either of tubes 1 or 2 when the space current in the other tube is a maximum. Due to the fact that tubes 1 and 2 are coupled in a regenerative loop it is impossible for a condition of stability to exist in which both tubes are conductive, since any change in the space current of either of the tubes would be caused to continue in the same direction, due to the regenerative action, until the current in one of the tubes is a maximum and that in the other is zero. Therefore the circuit has only two conditions of stability, namely (1) tube 1 conductive and tube 2 cut off and (2) tube 2 conductive and tube 1 cut off, and whenever disturbed will rapidly adjust itself to one or the other of these conditions.

Figure 2:
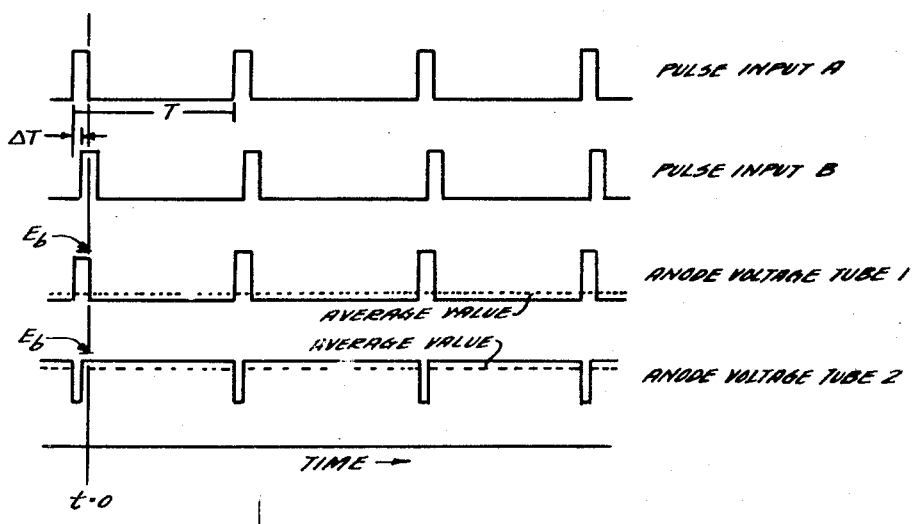

In order to utilize the above circuit to indicate the time sequence and time difference between two trains of pulses such as "A" and "B" in Fig. 2, it is necessary to provide means whereby the pulses can control the space current of tubes 1 and 2. This is accomplished by means of tubes 15 and 16 and their associated circuits. The anode of tube 15 is connected to the positive terminal of source 13 and its cathode is connected to the cathode of tube 1 whereby resistor 4 serves also as the load resistor of tube 15. Due to this circuit arrangement the potential of the cathodes of tubes 1 and 15 tends to follow the potential of the grid of tube 15. The pulse train "A" is applied to the grid of the tube 15 by means of coupling condenser 27 and grid resistor 17. A proper bias for tube 15 is provided by direct voltage source 18. When an "A" pulse is applied to the grid of tube 15 the cathode potential of tube 1 is raised. The pulse should be of sufficient magnitude to produce cut-off of tube 1 if this tube is in a conductive condition. The pulse train "B" is applied to tube 2 by tube 16. Tube 16 and its cooperation with tube 2 are the same as in the case of tubes 15 and 1. The output voltage of the circuit is taken from terminals 23 and 24 which are coupled to the anodes of tubes 1 and 2 by integrating networks 19—20 and 21—22 respectively. The purpose of these integrating networks is to cause the potential of the terminals to assume the average value of the corresponding anode potential.

Figure 4:
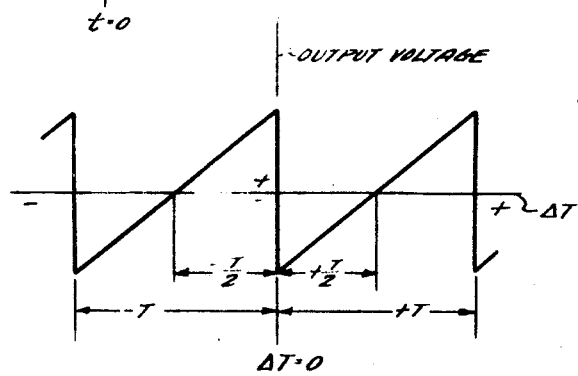
Fig. 4 is the output voltage characteristic of the circuit of Fig. 1.

The operation of the circuit may be understood with reference to Figs. 2, 3 and 4. Referring to Fig. 2 the pulse trains "A" and "B" consist of a series of equally spaced pulses separated by a time interval T with the "B" pulses lagging the "A" pulses by a small time interval $\Delta T$. The "A" and "B" pulses are applied to the corresponding input circuits of Fig. 1. Assuming tube 1 to be conductive the first "A" pulse acts to raise the cathode potential of tube 1 and to cut this tube off. As a result, the anode voltage of this tube rises to a value slightly below Eb, or the voltage of source 13, as shown in the anode voltage graph for this tube. A further result of the reduction of the space current of tube 1 to zero is to cause maximum conduction in tube 2 and a reduction in anode voltage as shown in the anode voltage graph for tube 2. However, before expiration of the "A" pulse, a "B" pulse occurs which is applied to tube 2 by tube 16. This causes tube 2 to be cut off and its anode voltage to rise as shown in the anode voltage graph for this tube. This condition obtains until the end of the "A" pulse, at which time tube 1 again becomes conductive due to the reduction of cathode voltage occurring at the end of the "A" pulse and the higher grid potential resulting from the high anode potential of non-conductive tube 2. No change occurs in the circuit at the end of the "B" pulse since, although the cathode potential of tube 2 is lowered in the absence of this pulse, the potential of source 14 is sufficiently greater than the reduced potential across resistor 6 when tube 1 is conducting to maintain the grid potential of tube 2 beyond the cut-off point. The circuit therefore remains in this state of equilibrium with tube 1 conducting and tube 2 cut off until the arrival of the next "A" pulse which again initiates the above described cycle of operation.

By referring to the anode voltage graphs of tubes 1 and 2 in Fig. 2 it is seen that the average value of the anode voltage in the case of tube 2 is greater than for tube 1. The difference in these two voltages will appear between terminals 23 and 24 (Fig. 1) and the greater of the two voltages will determine the polarity, which in this case results in terminal 24 being positive with respect to terminal 23. The terminal 24 will be positive with respect to terminal 23 so long as the "B" pulses occur later than the "A" pulses, however as the time difference increases the output voltage becomes less. This is illustrated in Fig. 3 which is similar to Fig. 2 except that $\Delta T$ has been increased. It will be noted that the average anode voltage of tube 2 has decreased and that of tube 1 has increased which results in a reduced voltage between terminals 23 and 24. However the polarity remains the same as the anode voltage of tube 2 still predominates. If $\Delta T$ is increased to equal T/2 then the two average anode voltages are equal and the output voltage is zero.

The relationship between output voltage and $\Delta T$ is shown by Fig. 4. As shown by the discontinuity in the curve at $\Delta T=0$ it is seen that the circuit is highly sensitive to small values of $\Delta T$. This sensitivity is such that the circuit is capable of differentiating time intervals as small as 0.0005 microsecond.

Figure 5:
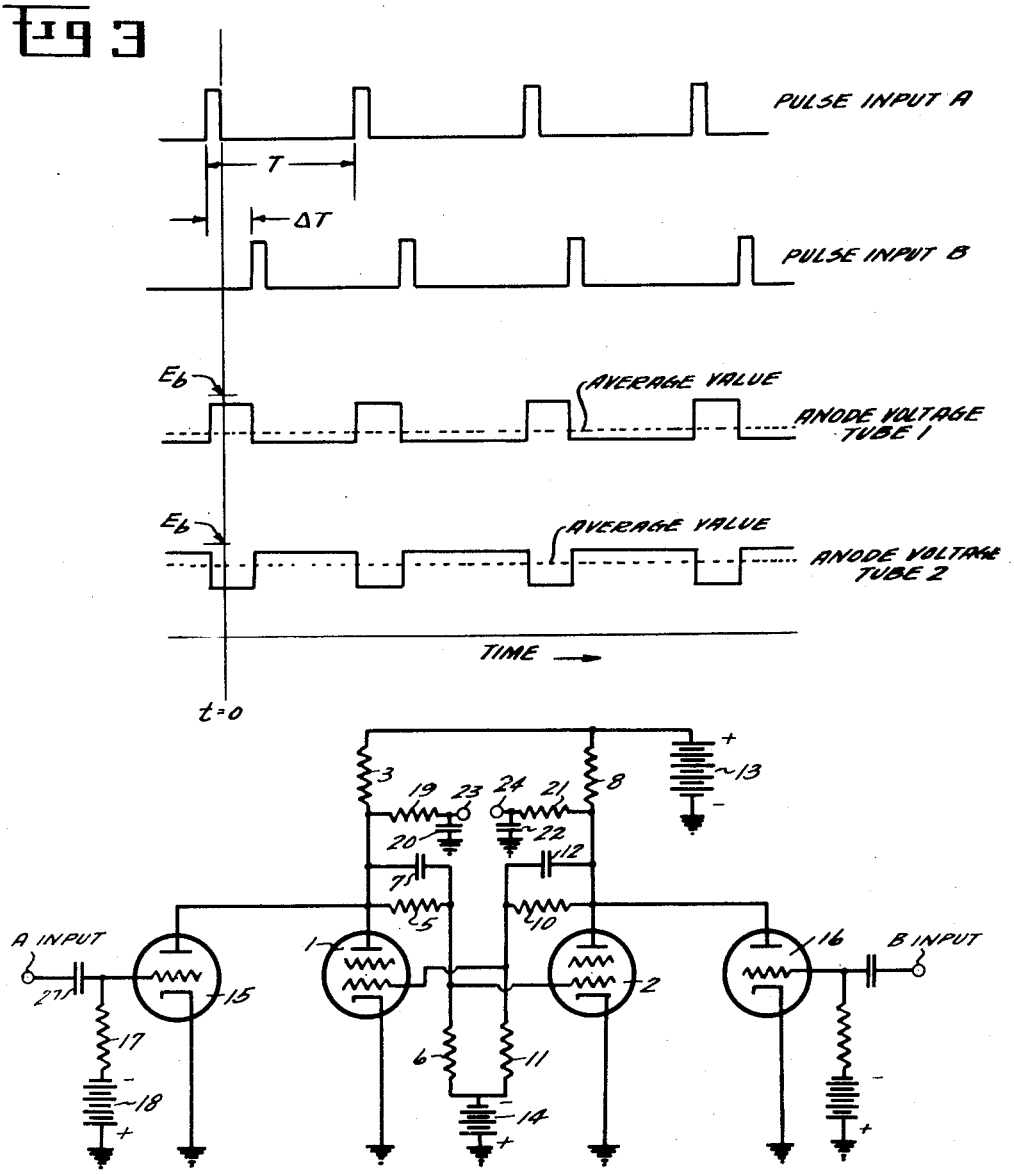
Figs. 5, 6 and 7 show modifications of Fig. 1.
Figure 6:
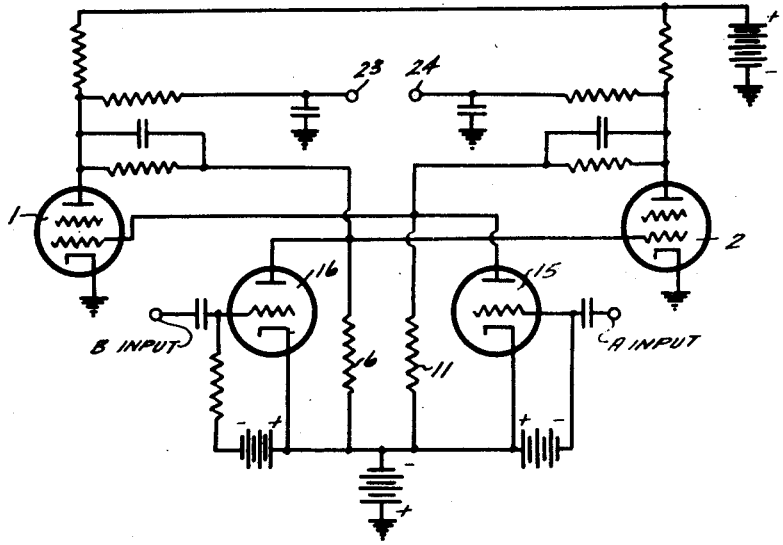
Figure 7:
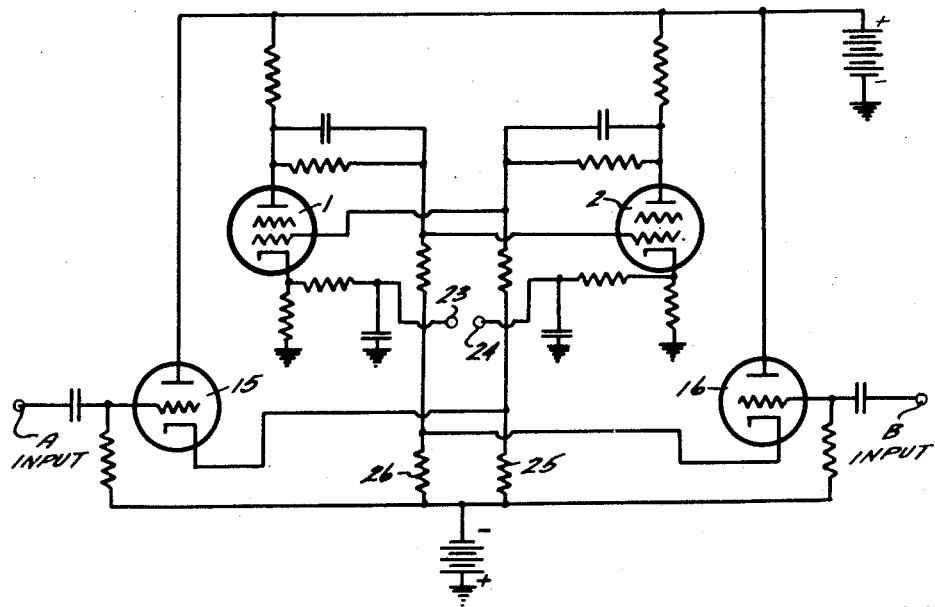

Various methods of applying the pulses to tubes 1 and 2 may be employed. In Fig. 5 the tubes 15 and 16 are coupled to tubes 1 and 2 so as to control the anode voltages of these tubes. In the presence of a pulse, the anode voltage of tube 1 or 2 is lowered sufficiently to produce cut-off in the tube. In Fig. 6 the tubes 15 and 16 have their anode load resistors located in the grid circuits of tubes 1 and 2 respectively so that in the presence of a pulse the grid potential is lowered beyond the cut-off point. In Fig. 7 tubes 15 and 16 operate in a manner similar to Fig. 6 except that in this case the tubes are connected as "cathode followers" with the load resistors 25 and 26 located in the cathode circuits of tubes 15 and 16 respectively. This modification is useful where the "A" and "B" pulses are negative instead of positive as no phase reversal is produced by the tubes 25 and 16 in this case. Fig. 7 also shows the output terminals 23 and 24 connected to the cathodes rather than the anodes of tubes 1 and 2.

As has been stated, and as shown in Fig. 4, the output characteristic of the above described circuits has a discontinuity at $\Delta T=0$. In order to provide an output characteristic which is continuous through the point $\Delta T=0$ and in which the output is a direct function of the magnitude of $\Delta T$ and the polarity of the output voltage is determined by the sign of $\Delta T$, the circuit shown in Fig. 8 may be employed. In this figure the circuit within the dotted enclosure 30 is substantially the same as that shown in Fig. 1. Slight variations are the use of pentode tubes for tubes 1' and 2' and triode connected pentode tubes for tubes 15' and 16', the use of additional elements 31, 32, 33 and 34 in the integrating network connected to terminals 23 and 24, and the use of a common bias source 14 for all tubes. Also any of the modifications of Fig. 1 shown in Figs. 5, 6 or 7 may be used in the block 30.

The blocks 35 and 36 designate identical modulated time delay circuits. "A" and "B" pulse inputs, such as shown in Fig. 2, are applied to circuits 35 and 36 respectively at the designated terminals. The outputs from circuits 35 and 36 are applied to circuit 30 by means of the ground connection and terminals 37 and 38 which correspond to the "A" and "B" input terminals of Fig. 1.

The modulated time delay circuit 35 comprises tubes 39, 40, 41 and 42, the first three of which have their cathodes connected together and to ground through resistor 43. The anode and grid electrodes of tube 40 are connected to the positive terminal of a source of direct potential 44 through resistors 45 and 46 respectively. In the stable condition of the circuit the grid of tube 40 adjusts itself to a potential slightly above that of the cathode. During unstable or transient conditions of the circuit, rapid changes of the potential of this grid are prevented by the condenser 47. The anode of tube 40 is coupled to the grid of tube 41 through variable condenser 48. The grid of this tube is returned to ground through resistors 49, 50 and 51 and the upper half of the secondary of transformer 52. The anodes of tubes 39 and 42 are connected directly to the positive terminal of the source 44. Means including coupling condenser 53 and grid resistor 54 are provided for applying the "A" pulses to the grid of tube 39.

The above described circuit has a stable condition in which tube 40 is conductive and tubes 39 and 41 are cut off by the voltage produced by the space current of tube 40 in flowing through common cathode resistor 43. This current is high due to the relatively high potential on the grid of tube 40. Application of a positive pulse to the grid of tube 39 causes the potential of the cathode of that tube to rise and also the potential of the cathode of tube 40 which is directly connected thereto. The rise in potential of the cathode of tube 40 reduces the current in that tube, since the grid potential can not change instantaneously due to condenser 47, and raises the anode voltage due to the decreased drop across resistor 45. This increase in anode voltage is applied to the grid of tube 41 through condenser 48 and drives the grid above the cut-off point so that this tube begins to conduct. The resulting current flow through resistor 43 raises the potential of the cathode of tube 40 and reduces the current of this tube still further which in turn raises still further the anode potential in tube 40 and the grid potential in tube 41 so that a regenerative action is produced which progresses very rapidly until tube 40 is cut off and tube 41 is conductive. Thus, by the above described process, the application of a positive pulse to tube 39 causes tube 40 to be immediately cut off and tube 41 to be rendered conductive.

The rise in potential of the anode of tube 40 due to the reduction of its space current to zero causes an increased voltage to be applied to condenser 48 which immediately begins to charge. As the charging of condenser 48 progresses the potential of the grid of tube 41 is lowered which reduces its space current and, as a result, the drop across resistor 43. This causes a lowering of the potential of the cathode of tube 40 which continues during the charging of condenser 48 until the cut-off point of tube 40 is reached. At this point space current begins to flow in tube 40 which lowers the anode potential of this tube. This drop in anode potential is applied to the grid of tube 41 through condenser 48 and acts to further depress the space current of this tube so that a regenerative action takes place which proceeds very rapidly until tube 40 has maximum space current and tube 41 is cut off by the increase in its cathode potential resulting from the space current of tube 40 flowing through resistor 43. The drop across resistor 43 is also sufficient to cut off tube 39 so that the circuit is now returned to its original stable condition. The condenser 55, connected between the cathode of tube 41 and a point located between resistors 49 and 50, is for the purpose of reducing the charging rate of condenser 48 thereby producing a more nearly linear variation of the charging current with time during the interval under consideration.

From the above it is seen that the leading edge of a pulse applied to the grid of tube 39 initiates a cycle of operation of the circuit the period of which is determined by the time constant of the charging path of condenser 48. During the cycle of operation a positive rectangular pulse, equal in length to the period of the cycle, is developed at the anode of tube 40. This pulse is applied to terminal 37 by means of the cathode-follower stage comprising tube 42.

The introduction of a positive voltage into the grid return circuit of tube 41 will add to the voltage supplied on the grid of tube 41 by the drop across resistor 45 so as to produce a greater time delay until relaxation of the circuit and therefore a longer pulse. A negative voltage for the same reason produces the opposite effect and shortens the output pulse. It is the function of transformer 52 to control the length of the pulses produced by circuit 25 and identical circuit 36 by introducing into the charging paths of condenser 48 and its counterpart in circuit 36 an alternating voltage having a period that is long compared to the period of the circuits. This is accomplished by means of the center-tapped secondary winding of this transformer the upper half of which is connected in the charging circuits of condenser 48 and the lower half of which is connected in the charging circuit of the corresponding condenser in circuit 36. The alternating voltages applied to the two circuits are therefore equal in amplitude and opposite in phase or polarity. This results in equal changes in the lengths of the output pulses of the two circuits but due to the phase opposition of the two inserted voltages the lengths of the pulses are changed in opposite directions. This is graphically illustrated at (a) and (b) in Fig. 8 in which $l$ represents the period of circuits 35 and 36 when $E=0$ and $kE_{max}f(t)$ represents the change in pulse length produced by E at a particular time $t$. The general expressions for the output pulse lengths of circuits 35 and 36 are therefore $$L_{35}=l\pm kE_{max}f(t)$$
$$L_{36}=l\mp kE_{max}f(t)$$

where $k$ is a constant and $f(t)$ is a function defining the way in which E varies with time. This may be a sine function or a function of another form depending upon the desired output characteristic of the system as will be explained later. The pulses produced by circuits 35 and 36 are therefore initiated by the leading edges of the "A" and "B" pulses and their trailing edges oscillate in time about the trailing edge of the pulse produced when $E=0$.

Test data on a particular modulated time delay circuit of the above described type were as follows:

"A" and "B" input pulse width = 1.0 microsecond
Output pulse width $l(E=O)=5.0$ microseconds
E (peak to peak) = 12 volts
Maximum value $kE_{max}f(t) = \pm 4.0$ microseconds
Non-linearity between $kE_{max}f(t)$ and $E=5\%$ As has been stated, the function of circuits 35 and 36 when used with the circuit 30, which has the characteristic shown in Fig. 4, is to remove the discontinuity at the point of coincidence of the "A" and "B" pulses and to cause the output voltage to increase with departure from coincidence. In order to adjust the circuit for operation in this manner it is first necessary to adjust the circuits 35 and 36 to produce pulses of equal length when $E=0$. This is accomplished by adjusting condenser 48 and/or resistor 49, or their counterparts in circuit 36, until the exact points of polarity reversal at terminals 23—24 is obtained.

Figure 8:
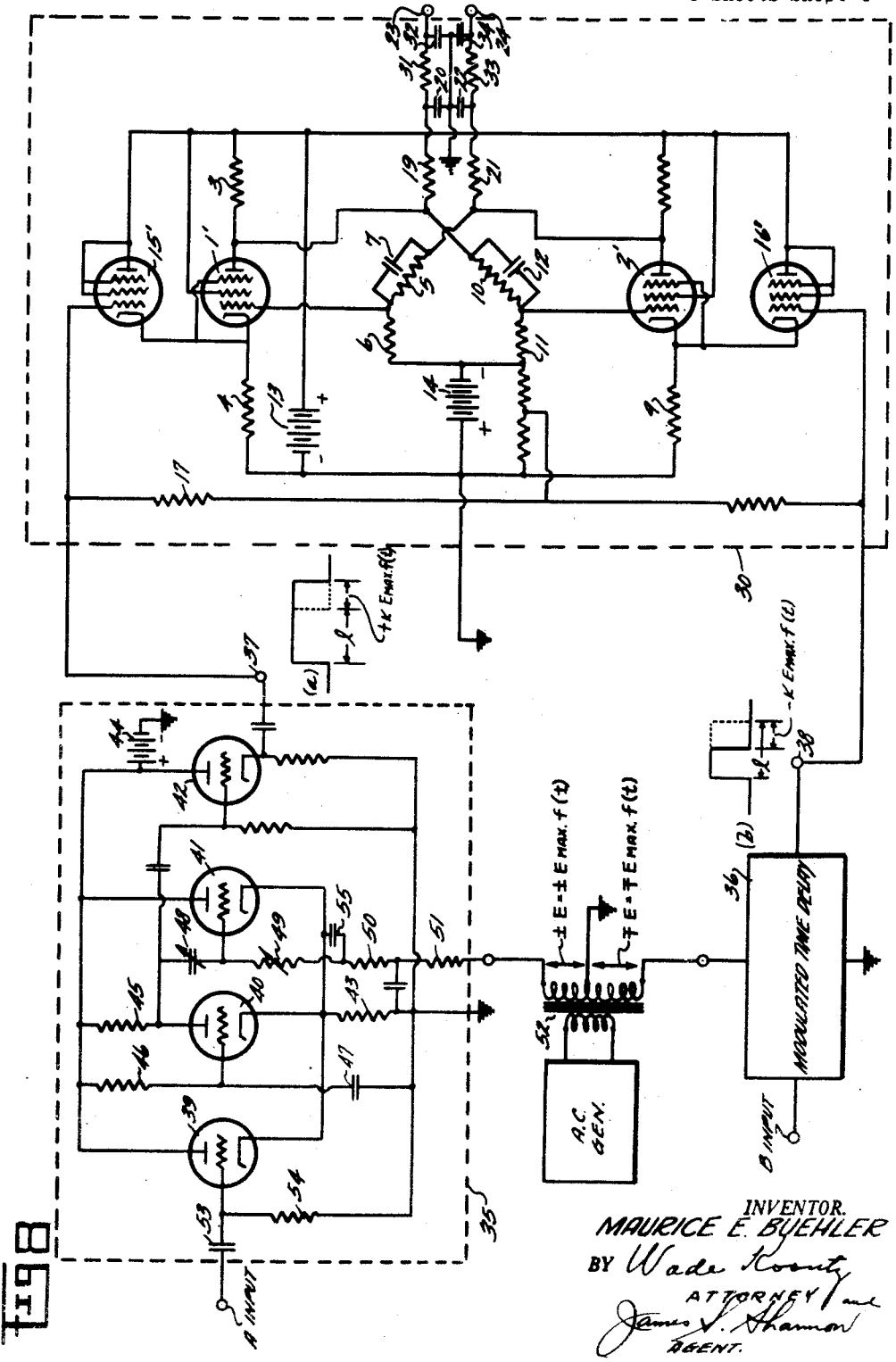
Fig. 8 shows a circuit arrangement having a continuous characteristic through the point of pulse coincidence.

To explain the operation of Fig. 8 first assume that the "A" and "B" pulse trains are in exact coincidence, that circuits 35 and 36 have been adjusted to produce pulses of equal length when $E=0$, and that E has such a value that the pulse produced by circuit 35 is longer than that produced by circuit 36 as shown at (a) and (b) in Fig. 8.

Application of pulses (a) and (b) to terminals 37 and 38 respectively causes both tubes 1' and 2' to be cut off. When pulse (b) decays, tube 2' is rendered conductive since tube 1' is still maintained in a non-conductive state by the longer pulse (a). However the decay of pulse (a) has no effect on the circuit since tube 1' is maintained in its non-conductive condition by the high bias present on the grid of the tube when tube 2' is conductive, which bias is sufficient to prevent conduction in tube 1' even in the absence of an input signal. Upon arrival of the next pair of (a) and (b) pulses in the train the non-conductive state of tube 1' is maintained by the (a) pulse while the conducting tube 2' is cut off for the duration of the (b) pulse. It is therefore seen that so long as the (a) pulse decays later than the (b) pulse tube 1' is maintained continuously in a non-conductive condition while tube 2' is cut off only in the presence of (b) pulses. Likewise, reversing the above conditions, whenever the (b) pulse decays later than the (a) pulse tube 2' is maintained continuously in a non-conductive condition while tube 1' is cut off only in the presence of (a) pulses.

As has been explained, the application of the alternating voltage E to circuits 35 and 36 causes the trailing edges of the pulses produced by their circuits to vary in time about the basic pulse length indicated as $l$ in the pulses (a) and (b) of Fig. 8. Since the voltage E is applied with equal amplitude and opposed phase in circuits 35 and 36 the lengths of the pulses are affected in opposite directions so that if one pulse is increased over the basic length $l$ by a given amount the other pulse will be decreased from the basic length by an equal amount. Since E is an alternating voltage both pulses vary from a minimum length of $l-m$ to a maximum length of $l+m$ where $m$ is the maximum value of $kE_{max}f(t)$.

Therefore when the "A" and "B" input pulse trains are in exact coincidence the (a) pulse will decay later than the (b) pulse during one-half cycle of E and will decay earlier than the (b) pulse during the remaining half cycle. Hence the two conditions described in the second paragraph above exist alternately in each of tubes 1' and 2' for equal lengths of time. This results in an alternating voltage between the anodes of tubes 1' and 2' made up of a fundamental having a frequency equal to that of E and a number of harmonics of this frequency. These alternating voltages are prevented from reaching output terminals 23 and 24 by the filter comprising elements 19—22 and 31—34 so that for exact coincidence of the input pulses the output voltage at terminals 23—24 is zero.

Figure 9:
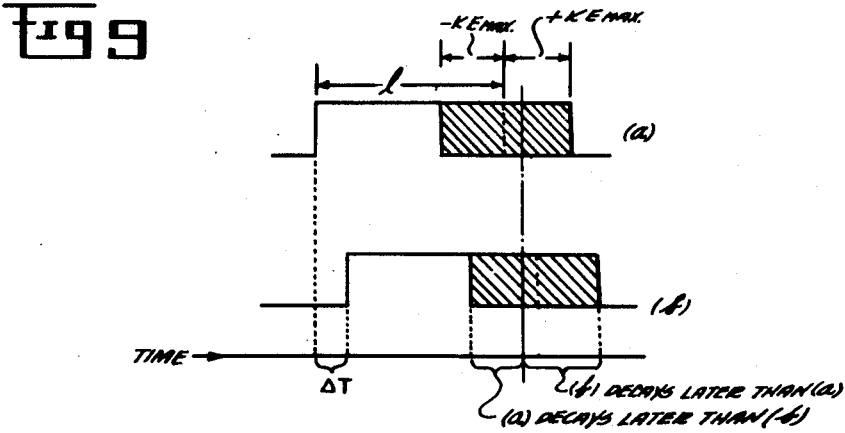
Fig. 9 is a diagram explaining the operation of Fig. 8.

When the "A" and "B" input pulses are not in exact coincidence the operation of the circuit is modified to produce a resultant direct voltage between the output terminals the polarity of which is determined by the pulse sequence and the amplitude of which is determined by the time difference between corresponding pulses. In Fig. 9 is illustrated the condition in which the "B" input pulses occur later than the "A" input pulses by an amount $\Delta T$ so that the leading edges of the resulting (a) and (b) pulses differ by the same time interval $\Delta T$ as shown. The shaded areas of the (a) and (b) pulses represent the shift of the trailing edges due to the voltage E. It will be noted from the figure that the condition in which (b) decays later than (a) exists over a greater portion of a cycle of E than does the condition in which (a) decays later than (b). That this is true will be apparent from a more detailed consideration of Fig. 9. In this figure the pulse (a) is produced by circuit 35 of Fig. 8 and pulse (b) by circuit 36 of Fig. 8. When E, as defined in Fig. 8, is zero both pulses (a) and (b) have the same length $l$, the trailing edges in this case being indicated by the dotted lines in the shaded areas of Fig. 9. When the alternating voltage E has some value other than zero the (a) pulse is lengthened to the right of its dotted line and the (b) pulse is shortened an equal amount to the left of its dotted line during one half-cycle of E, and the (a) pulse is shortened to the left of its dotted line and the (b) pulse lengthened to the right of its dotted line by an equal amount during the other half-cycle of E. Since the lengths of the pulses (a) and (b) vary from the length $l$ by equal amounts and in opposite directions the trailing edges of these pulses must cross or become coincident twice during each cycle of E. The point at which this coincidence occurs is indicated by the vertical center line in Fig. 9 which is located midway between the trailing edges of the two pulses for $E=0$, said trailing edges being represented by the dotted lines in the shaded areas for each pulse. If the leading edges of pulses (a) and (b) are in exact coincidence then the center line coincides with the two dotted lines and the trailing edge of pulse (b) is to the right of, and the trailing edge of pulse (a) to the left of the center line for the same portion of a cycle of E that the trailing edge of pulse (b) is to the left of, and the trailing edge of pulse (a) to the right of the center line. Therefore pulse (a) decays later than pulse (b) and pulse (b) decays later than pulse (a) for equal portions of a cycle of E. However, if pulse (b) lags pulse (a), as shown in Fig. 9, then the trailing edges of pulses (a) and (b) are to the left and right, respectively, of the center line for a greater portion of a cycle of E than they are to the right and left, respectively, of the center line. Hence, for this condition, pulse (b) decays later than pulse (a) for a portion of a cycle of E that is greater than the portion during which pulse (a) decays later than pulse (b). Therefore, as explained above, tube 2' is maintained in a non-conductive state for a greater portion of a cycle of E than is tube 1'. This results in a higher average potential on the anode of tube 2' than on the anode of tube 1' and consequently a direct voltage between terminals 23—24 with 24 as the positive terminal. The alternating components existing between the anodes are removed by the filter preceding the output terminals as before. As the time interval $\Delta T$ increases, the unbalance between the times of non-conductivity of tubes 1' and 2' is increased and as a result the voltage between terminals 23 and 24 rises. This continues until $\Delta T$ becomes equal to $kE_{max}$ which is the limit of operation in the above described manner. If $\Delta T$ exceeds $kE_{max}$ then one of the pulses will always decay later than the other and operation in a manner similar to that of Fig. 1 takes place. For the condition in which the "A" pulses occur later than the "B" pulses operation is the reverse of that described above and terminal 23 is the positive terminal.

Figure 10:
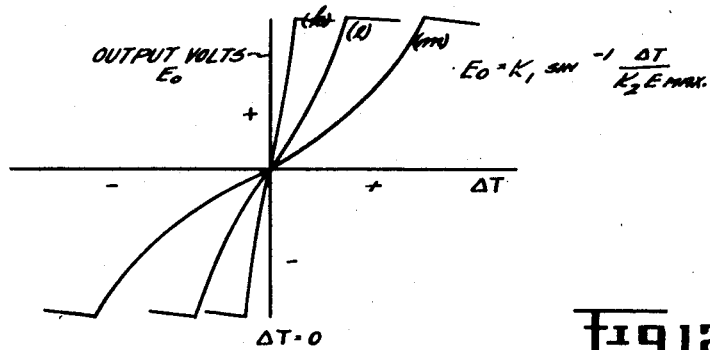
Fig. 10 shows the operating characteristic of Fig. 8 with a sinusoidal modulating voltage.
Figure 11:
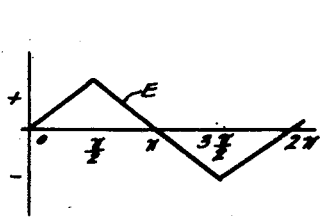
Fig. 11 shows a triangular modulating wave.
Figure 12:
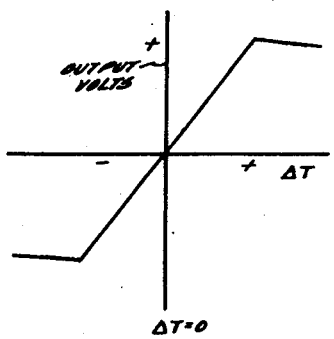
Fig. 12 shows the operating characteristic of Fig. 8 when using the triangular wave of Fig. 11.

The shape of the output voltage versus $\Delta T$ characteristic is determined by the wave shape of E. If E is a sinusoidal voltage then the characteristic is the inverse sine function $$E_0 = K_1 \sin^{-1} \frac{\Delta T}{K_2 E_{max}}$$

where,
$E_0$ = output voltage
$K_1$ and $K_2$ = constants
$\Delta T$ = time difference between corresponding pulses as shown in Fig. 10. The three curves (k), (l) and (m) are for different values of $E_{max}$, the slopes decreasing as $E_{max}$ increases. If the wave form of E triangular as shown in Fig. 11 then the output characteristic is linear as shown in Fig. 12.

Under test conditions a direct output signal of 9.5 volts has been obtained for a value of $\Delta T = 0.05$ microsecond.

The averaging of data available from the circuits of tubes 1' and 2' is not a particular feature or a necessity for the utilization of such data. As previously described, during the time that the input signal to tube 15' is decaying later than that to 16' tube 1' remains cut off either due to the action of tube 15' or the signal fed back from tube 2'. Therefore even the pulse wave forms do not appear across the plate resistor of tube 1'. However, during this same period, pulses in phase with the input signal to tube 16' appear across the plate load resistor of tube 2'. The number of such pulses appearing across the plate load resistor of tube 2' is proportional to the percentage of a full period of E that tube 2' is conducting. Likewise, during the remainder of the full period, when tube 1' is conducting, the number of pulses which appear across the plate resistor of tube 1' is proportional to the percentage of a full period of E that tube 1' is conducting. Since pulses from the plate of tube 1' during one cycle of E may be assigned to represent positive or negative values of $\Delta T$, and pulses from the plate of tube 2' during the same cycle of E may be assigned to represent negative or positive values of $\Delta T$, auxiliary means may be provided to compare the number of pulses from tube 1' with the number from tube 2' during each cycle of the modulating signal E and arrive at a new value for $\Delta T$ for each successive cycle of the modulating signal.

The unique characteristic of the device of delivering numerical quantities of pulses determined by the time relation of the input signals may be further utilized to determine the average rate at which $\Delta T$ is increasing or decreasing during successive periods of the modulating signal E. This rate is defined as $\Delta T/dt$, and since E is a continuous function of time, a single or multiple period of E may be used as the quantity $dt$ for a unique solution of this equation by merely introducing an additional numerical pulse subtracting circuit which determines the difference in pulse numbers during successive full cycles of the modulating signal E. The operations to obtain the first three derivatives are as follows:

Let $N$ = difference in number of pulses between tube 1' and tube 2' during a single cycle of E.
$t = K$, a constant = single cycle period of E.
$M_1 = N_1 - N_2$ = successive difference of the differences in pulse numbers for successive cycles of E.
$T = \Delta T N$ then $$\frac{dT}{dt} = \frac{N_1 - N_2}{t} = \frac{M_1}{t} = \frac{M_1}{k}$$

$$\frac{d^2T}{dt^2} = \frac{1}{t}\left(\frac{M_1}{t} - \frac{M_2}{t}\right) = \frac{1}{K^2}(M_1 - M_2)$$

$$\frac{d^3T}{dt^3} = \frac{(M_1 - M_2) - (M_2 - M_3)}{K^3}$$

From the above, it can be seen that measurement of rates of change of the timing of the input signals can be accomplished without any computation but subtraction of successive pulse numbers occurring during the sampling period $t$.

In the above, it was assumed that while pulses are supplied from tube 1' none are coming from tube 2'. Actually in this case a pulse will be supplied when at time difference exists between the leading edges of the input signals. As long as the nominal delay $t_2$ is greater than the maximum value of $\Delta T$ to be handled, the unwanted pulses which have a duration equal to $\Delta T$ may be discriminated against in the external circuit in favor of the much longer pulse having duration of $t_2 \pm kE_{max}f(t)$.

By continuously holding $\Delta T = 0$, it is possible to obtain data quantization by superimposing the wave form to be converted upon the modulating signal E. In this case pulses are delivered from tube 1' and tube 2' whose number and output location define the average magnitude and polarity respectively of the waveform during the sampling period.

I claim as my invention:

1. A circuit for comparing two trains of equally spaced pulses for the purpose of producing a direct voltage with polarity a function of pulse sequence and amplitude a function of time difference between corresponding pulses of the two trains, said circuit comprising a pair of delay pulse producing circuits, means for applying one of said pulse trains to one of said delay pulse producing circuits and the other of said pulse trains to the other of said delay pulse producing circuits for triggering said circuits, means for varying the lengths of the pulses produced by said delay pulse producing circuits in equal amounts and opposite phase and in accordance with a predetermined periodic function of time having a frequency low as compared to the pulse repetition rate of said pulse trains, a pair of amplifier tubes, means including coupling means between the output electrodes of each amplifier tube and the input electrodes of the other amplifier tube for connecting said tubes in a regenerative loop, means for applying the output pulse of one of said delay pulse producing circuits to the control electrode of one of said amplifier tubes and the output pulse of the other of said delay pulse producing circuits to the control electrode of said other amplifier tube for rendering said amplifier tubes non-conductive in the presence of a pulse applied thereto, and an output circuit connected between the anodes of said two amplifier tubes.

2. Apparatus as claimed in claim 1 in which a low pass filter is included in said output circuit.

3. A circuit for comparing two trains of equally spaced pulses for the purpose of producing a direct voltage with polarity a function of pulse sequence and amplitude a function of time difference between corresponding pulses of the two trains, said circuit comprising first, second, third and fourth vacuum tubes, each of said tubes having at least an anode, a grid and a cathode, a source of direct current having its negative terminal connected to a point of reference potential, means for connecting the anodes of said first and second tubes through similar load resistors to the positive terminal of said source, and the cathodes of these tubes through similar cathode resistors to said point of reference potential, a source of bias potential having its positive terminal connected to said point of reference potential, a resistive potential divider connected between the anode of said first tube and the negative terminal of said bias source and a similar potential divider connected between the anode of said second tube and the negative terminal of said bias source, means for connecting the grid of said first tube to an intermediate point on the potential divider associated with the second tube and means for connecting the grid of said second tube to a similar intermediate point on the potential divider associated with the first tube, a capacitor connected between the anode of said first tube and the grid of said second tube and a similar capacitor connected between the anode of said second tube and the grid of said first tube, the capacities of said capacitors being of the proper size to compensate for the effect of the input capacities of the two tubes on the frequency characteristic of the system, means for connecting the anodes of said third and fourth tubes directly to the positive terminals of said direct current source, a direct connection between the cathode of said third tube and the cathode of said first tube and a similar direct connection between the cathode of said fourth tube and the cathode of said second tube, a pair of output terminals, means including an averaging network for connecting one of said pair of terminals to the anode of said first tube and similar means for connecting the other of said pair of terminals to the anode of said second tube, means for applying one of said trains of pulses between the grid of said third tube and said point of reference potential, and means for applying the other of said train of pulses between the grid of said fourth tube and said point of reference potential.

4. Apparatus as claimed in claim 3 in which the cathodes of the first and second tubes are connected directly to said point of reference potential and in which said third tube has its anode connected to the grid of said first tube and its cathode connected to the negative terminal of said bias source and said fourth tube has its anode connected to the grid of said second tube and its cathode connected to the negative terminal of said bias source.

5. Apparatus as claimed in claim 3 in which the cathodes of said first and second tubes are connected directly to said point of reference potential and in which said third tube has its anode connected to the anode of said first tube and its cathode connected to said point of reference potential and said fourth tube has its anode connected to the anode of said second tube and its cathode connected to said point of reference potential.

MAURICE E. BUEHLER.

REFERENCES CITED

The following references are of record in the file of this patent:

UNITED STATES PATENTS

| Number | Name | Date |
|---|---|---|
| 2,158,285 | Koch | May 16, 1939 |
| 2,301,193 | Bradford et al. | Nov. 10, 1942 |
| 2,301,196 | Bradford | Nov. 10, 1942 |
| 2,335,265 | Dodington | Nov. 30, 1943 |
| 2,412,111 | Wilson | Dec. 3, 1946 |
| 2,432,204 | Miller | Dec. 9, 1947 |
| 2,438,910 | Grieg | Apr. 6, 1948 |
| 2,440,547 | Jensen | Apr. 27, 1948 |